July 14, 1925.
H. SCARNECCHIA
SHOCK ABSORBER FOR BICYCLES
Filed Aug. 26, 1924
1,546,257
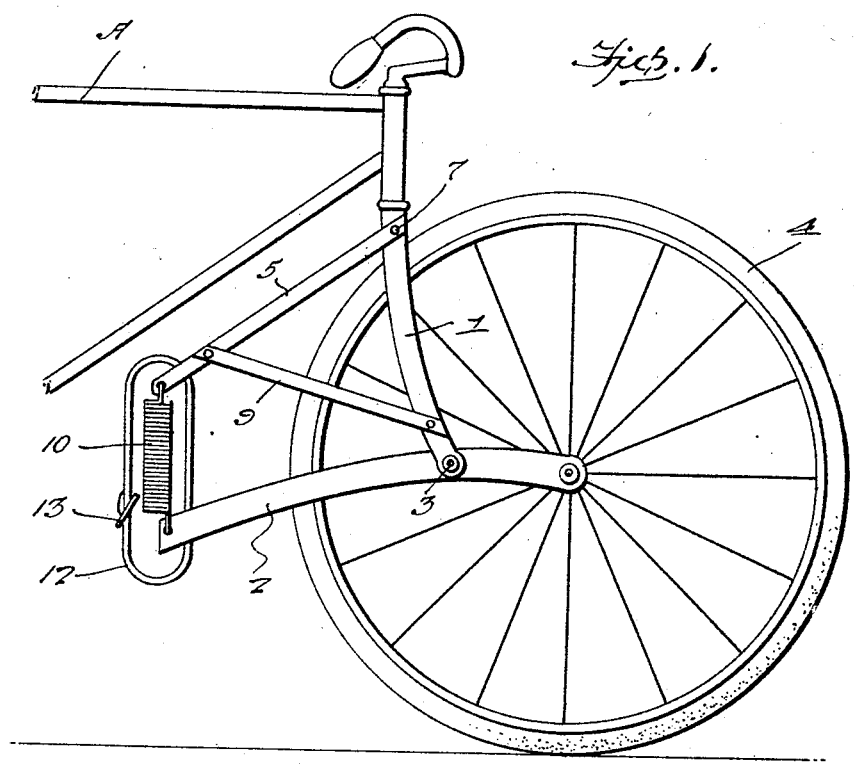
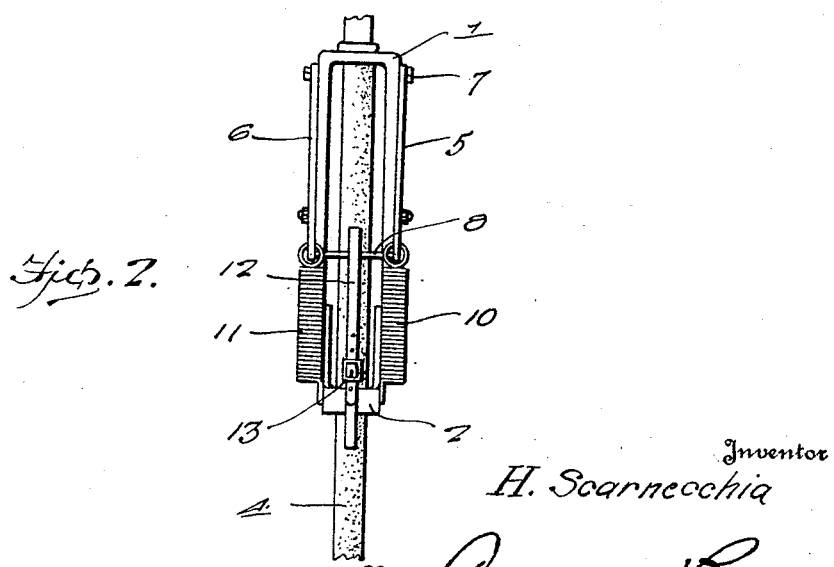
Inventor
H. Scarnecchia
By Clarence A. O'Brien
Attorney Patented July 14, 1925.

1,546,257

UNITED STATES PATENT OFFICE.

HAROLD SCARNECCHIA, OF YOUNGSTOWN, OHIO.

SHOCK ABSORBER FOR BICYCLES.

Application filed August 26, 1924. Serial No. 734,259.

*To all whom it may concern:*

Be it known that I, HAROLD SCARNECCHIA, a citizen of the United States, residing at Youngstown, in the county of Mahoning and State of Ohio, have invented certain new and useful Improvements in a Shock Absorber for Bicycles, of which the following is a specification.

This invention relates to improvements in shock absorbers for bicycles and has for its primary object to provide a means whereby the operator of the vehicle may ride with comfort while traveling over rough and uneven surfaces.

Another important object of the invention is to provide a shock absorber of the above mentioned character, which includes a means for eliminating the vibrations caused by the wheels of the bicycle encountering rough portions of the road and further preventing any injury to the frame of the bicycle when such obstacles are encountered.

A further object of the invention is to provide a shock absorber for bicycles of the above mentioned character, which is simple in construction, inexpensive, strong and durable and furthermore adapted for the purposes for which it is designed.

Other objects and advantages of this invention will become apparent during the course of the following description.

In the accompanying drawing forming a part of this specification and in which like numerals designate like parts throughout the same:

Figure 1 is a side elevation of my improved invention showing the same in use, and Figure 2 is a rear end elevation thereof.

In the drawing wherein for the purpose of illustration is shown the preferred embodiment of my invention, the numeral 1 designates a bicycle fork forming a part of the frame A of a bicycle and as the same is of the well known construction, a further detailed description thereof is not thought necessary. Pivotally supported intermediate its ends between the lower free ends of the arms of the bicycle fork 1 is the yoke designated generally by the numeral 2. The pivotal connection between the yoke and the fork is illustrated at 3 in the drawing. Mounted in the forward end of the yoke 2 and the forward end of the bicycle form 1 is the wheel 4. The yoke 2 is curved slightly downwardly toward the rear end thereof in the manner also clearly illustrated in Figure 1.

Extending rearwardly from the upper portion of the bicycle fork 1 and inclined downwardly are the arms 5 and 6 respectively. The upper or forward ends of the arms are secured to the bicycle fork 1 by any suitable fastening means such as is shown at 7 and the rear ends of the arms are disposed above the rear portion of the yoke 2. A rod or bar 8 extends between the rear ends of the arms 5 and 6 and the purpose thereof will hereinafter be more fully described. Bracing means such as is shown at 9 extends between the lower portion of the bicycle fork 1 and the arms 5 and 6 adjacent the rear ends thereof whereby the arms are supported in a rigid position on the bicycle fork. Associated with the yoke 2 and the arms 5 and 6 are a pair of coil springs 10 and 11 respectively. The upper ends of the springs are connected to the rear ends of the arms 5 and 6 respectively while the lower ends of the spring are fastened to the opposed sides of the yoke 2 adjacent the rear end thereof in the manner clearly illustrated in the drawing.

For the purpose of limiting the expansion of the coil springs 10 and 11 and the downward movement of the rear end of the yoke 2, the safety strap 12 is provided and the same extends around the rod 8 between the arms 5 and 6 and the rear portion of the yoke 2 in the manner as more clearly illustrated in Figure 2. The strap is provided with the usual buckle 13 whereby the same may be adjusted for increasing or diminishing the loop formed thereby as may be desired.

It is of course to be understood that each of the forks is provided with a shock absorber of the above mentioned character, and as the parts are of the same construction, the description of one is thought sufficient.

The provision of a shock absorber for bicycles of the above mentioned character will enable a person operating the same to ride comfortably over any rough or uneven surface which may be encountered and yet enable a person to properly control the propulsion of the bicycle. Furthermore the provision of a shock absorber of this character will prevent any possibility of the forks of the bicycle from buckling as frequently happens when the wheels of the bicycle encounter rough places in the road.

The parts of the present invention are so arranged as to enable the same to be readily assembled or disassembled as may be necessary.

While I have shown the preferred embodiment of my invention, it is to be understood that various changes in the size, shape and arrangement of parts may be resorted to without departing from the spirit of the invention, and the scope of the appended claims.

Having thus described the invention, what I claim is:—

1. In combination with a bicycle fork and a wheel, of a yoke pivotally supported intermediate its ends on the lower portion of the fork, the forward end of the yoke being open and providing a mounting for said wheel, a pair of arms secured at their forward ends to the upper portion of said fork and extending rearwardly therefrom, bracing means connected to the arms and said fork, and resilient means connected at its respective ends to the rear ends of the arms and the rear portion of the yoke respectively.

2. In combination with a bicycle fork and a wheel, of a yoke pivotally supported intermediate its ends on the lower portion of the fork, the forward end of the yoke being open and providing a mounting for said wheel, a pair of arms secured at their forward ends to the upper portion of said fork and extending rearwardly therefrom, bracing means connected to the arms and said fork, resilient means connected at its respective ends to the rear ends of the arms and the rear portion of the yoke respectively, and means for limiting the expansion of said resilient means.

3. In combination with a bicycle fork and a wheel, of a yoke pivotally supported intermediate its ends on the lower portion of the fork, the forward end of the yoke being open and providing a mounting for said wheel, a pair of arms secured at their forward ends to the upper portion of said fork and extending rearwardly therefrom, bracing means connected to the arms and said fork, resilient means connected at its respective ends to the rear ends of the arms and the rear portion of the yoke respectively, means for limiting the expansion of said resilient means, said means comprising a rod extending transversely between the rear ends of the arms, and a strap extending around the rod and the rear closed portion of said yoke.

In testimony whereof I affix my signature.

HAROLD SCARNECCHIA.